May 23, 1933.  A. Y. DOWELL  1,910,528
WATER COOLER
Filed Dec. 5, 1931
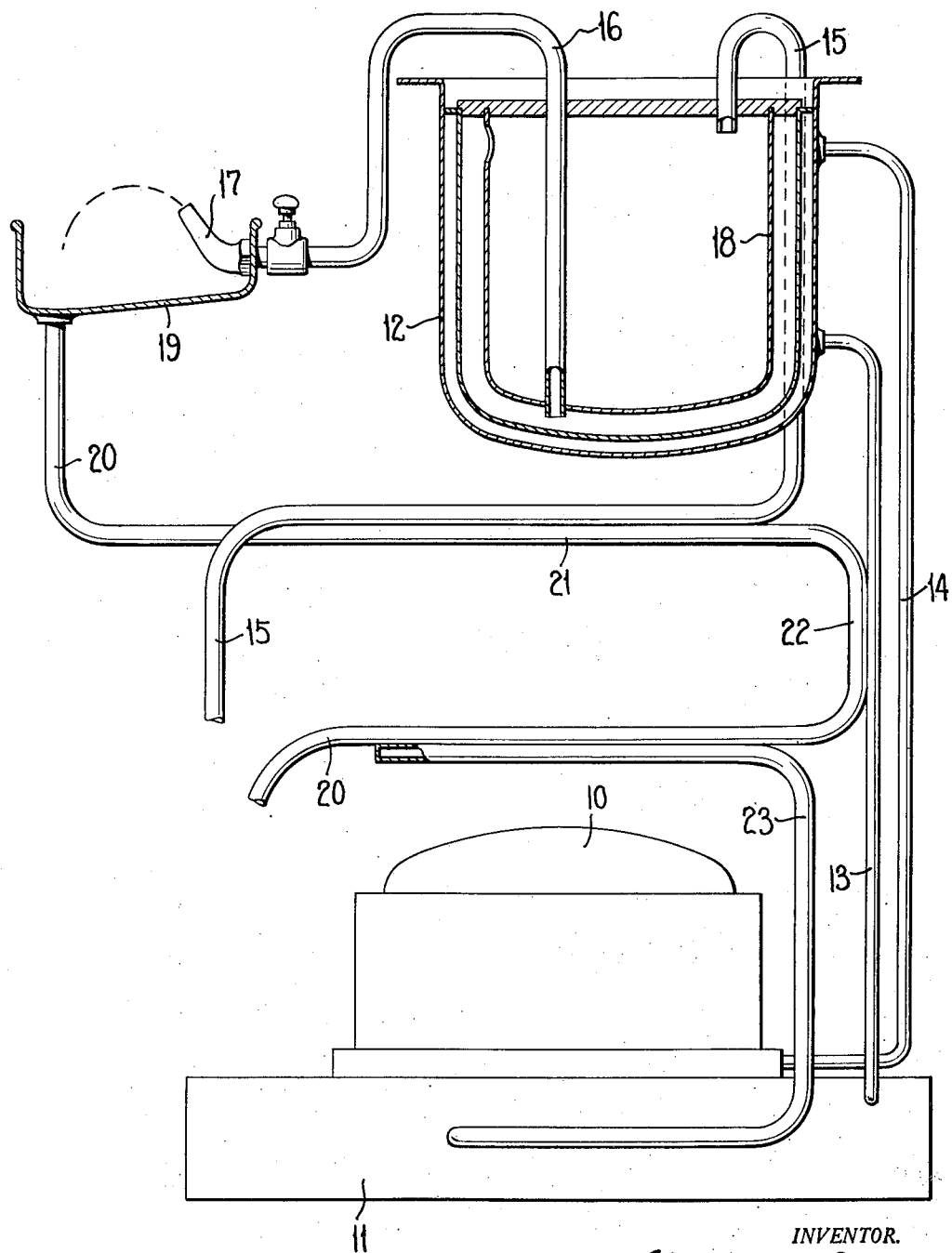
INVENTOR.
Alvis Yates Dowell Patented May 23, 1933

1,910,528

UNITED STATES PATENT OFFICE

ALVIS YATES DOWELL, OF HASTINGS-UPON-HUDSON, NEW YORK, ASSIGNOR TO SERVEL, INC., OF NEW YORK, N. Y., A CORPORATION OF DELAWARE

WATER COOLER

Application filed December 5, 1931. Serial No. 579,169.

This invention relates to a refrigerating system adapted for use in cooling drinking water, and it is an object of the invention to render more efficient a device of this character by transferring heat from the heat-emitting parts of the system to the waste water that has been previously cooled.

The invention will be readily understood by reference to the following description taken in connection with the accompanying drawing, in which, The figure is a fragmentary, diagrammatic view partly in section illustrating one application of the invention.

Referring to the drawing, there is shown a motor compressor unit 10, a condenser 11, a cooling unit 12, and supply and return lines 13, and 14, respectively, through which refrigerant passes into and from the space between the walls of the evaporator or cooling unit. Drinking water from a city supply line, or other source of supply is conveyed through pipe 15 into the top of the evaporator, and water is discharged by means of a pipe 16, through a valve controlled drinking nozzle 17. The pipe 16 extends from the lower portion of the evaporator, and in order to require the water to travel circuitously through the evaporator, a partition 18 is disposed between the inlet and discharge pipes 15, and 16. Water wasted from the nozzle 17, is collected in a basin 19, from whence it is discharged through a waste pipe 20.

In order to remove heat and thereby reduce the temperature of the water coming into the evaporator through the pipe 15, the pipes 15, and 20 are disposed in good thermal contact to form a heat exchanger 21, and in order to further remove heat from refrigerant passing through the supply line 13 to the evaporator, the waste pipe 20 is also placed in good thermal contact with the pipe 13 to form a heat exchanger 22.

Heat emitted by the refrigerant in its change of state from vapor to liquid is removed by means of a secondary cooling system. This secondary system comprises a closed vessel 23, which has its lower portion in good thermal contact with the condenser 11, and its upper portion in good thermal contact with the waste water pipe 20, the vessel 23 being partially filled with a volatile fluid, preferably having a low boiling point. It will be understood, of course, that the manner of connecting the closed vessel 23, with the condenser, and with the waste water pipe may be adapted to the specific type of condenser, and secured to each in the manner best suited for the purpose.

It will be obvious to those skilled in the art that various other changes may be made in the construction and arrangement without departing from the spirit of the invention and therefore the invention is not limited to what is shown in the drawing and described in the specification but only as indicated in the appended claims.

What is claimed is:

1. A refrigerating system for cooling drinking water comprising a compressor, a condenser, an evaporator, a pipe for supplying refrigerant from the condenser to the evaporator, a pipe for supplying water to the evaporator, means for discharging water from the evaporator, a pipe for carrying away waste water, said waste water pipe being in heat exchange relation with the water supply pipe and the refrigerant supply pipe, and a secondary cooling element comprising a closed vessel containing volatile fluid having its liquid phase in heat exchange relation with the condenser and its vapor phase in heat exchange relation with said waste pipe, whereby heat from the incoming water, from the refrigerant passing to the evaporator, and from the condenser is transferred to the waste water.

2. In a system of the class described including a waste water pipe, means for transferring heat from a condenser to the waste water pipe comprising a closed vessel containing a volatile fluid and having its liquid phase in contact with the heat emitting part and its vapor phase in contact with the waste water pipe.

3. In a refrigerating system for cooling drinking water a cooling unit, a supply line for admitting water to said cooling unit, a waste line, a refrigerating unit having heat emitting parts for supplying refrigerant to said cooling unit, and a secondary cooling system connecting certain of said heat emitting parts with said waste line.

4. In combination a water cooler comprising means for supplying liquid to be cooled, means for discharging waste cooled liquid, a refrigerating system including a condenser, an evaporator and means for conducting liquid refrigerant from one to the other, and means for transferring heat to the waste cooled liquid from the liquid to be cooled, the liquid refrigerant, and the condenser.

5. In combination a water cooler comprising means for supplying liquid to be cooled, means for discharging waste cooled liquid, a refrigerating system including a condenser, an evaporator and means for conducting liquid refrigerant from one to the other, and means for transferring heat to the waste cooled liquid respectively from the liquid to be cooled, the liquid refrigerant, and the condenser.

6. In a refrigerating system for cooling liquid and from which cooled liquid is discharged, means for transferring to said discharged liquid heat from liquid to be cooled, heat from liquid refrigerant passing from the condenser to the evaporator, and heat from one or more heat emitting elements.

7. In a refrigerating system for cooling liquid and from which cooled liquid is discharged, means for transferring to said discharged liquid heat from liquid to be cooled, heat from liquid refrigerant passing from the condenser to the evaporator, and heat from one or more heat emitting elements respectively.

8. That improvement in the art of refrigeration which comprises transferring to waste refrigerated fluid, heat from the fluid prior to its refrigeration, heat from refrigerant between its condensation and evaporation, and heat produced by the condensation of refrigerant.

9. That improvement in the art of refrigeration which comprises transferring to waste refrigerated fluid, heat from refrigerant between its condensation and evaporation, and heat produced by the condensation of refrigerant by means of a secondary heat-exchange system.

10. In combination in a refrigerating system for cooling drinking water a cooling unit, a condenser, a conduit for liquid refrigerant connecting the cooling unit and condenser, a conduit for supplying water to be cooled to the cooling unit, a conduit for waste water discharged from the cooling unit, said waste water conduit being disposed in heat exchange relation with the water supply conduit, the liquid refrigerant conduit and the condenser.

11. In combination in a refrigerating system for cooling drinking water a cooling unit, a condenser, a conduit for liquid refrigerant connecting the cooling unit and condenser, a conduit for supplying water to be cooled to the cooling unit, a conduit for waste water discharged from the cooling unit, said waste water conduit being disposed in thermal contact with the water supply conduit and the liquid refrigerant conduit, and a secondary heat exchanger connecting the waste water conduit and the condenser.

In testimony whereof, I affix my signature.
ALVIS YATES DOWELL.